Figure 1:
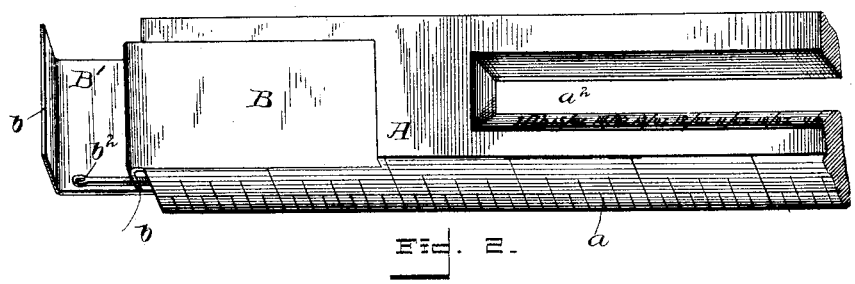

(No Model.)

M. F. CONNETT, Jr.
COMBINED DESK RULER AND SCALE.

No. 589,642. Patented Sept. 7, 1897.

Witnesses
F. S. Belt.
H. A. Kelly.

Inventor
Matthew F. Connett Jr.
By Davis H. Mead
Attorney

THE NORRIS PETERS CO., PHOTO-LITHO., WASHINGTON, D. C.

UNITED STATES PATENT OFFICE.

MATTHEW F. CONNETT, JR., OF MEMPHIS, TENNESSEE, ASSIGNOR TO EDWARD E. CORD, OF SAME PLACE.

COMBINED DESK-RULER AND SCALE.

SPECIFICATION forming part of Letters Patent No. 589,642, dated September 7, 1897.

Application filed January 12, 1897. Serial No. 619,005. (No model.)

*To all whom it may concern:*

Be it known that I, MATTHEW F. CONNETT, Jr., a citizen of the United States, residing at Memphis, in the county of Shelby and State of Tennessee, have invented certain new and useful Improvements in a Combined Desk-Ruler and Scale; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to combined desk-rulers and scales.

The object of the invention is to produce an article of the kind referred to which shall be capable of the uses of an ordinary desk-ruler and scale for weighing mail-matter and other light articles, and which shall be so constructed and formed that the parts by which the article is adapted for weighing shall not interfere with the use of the article for the usual purposes of a ruler.

Further, the object of the invention is to produce a combined desk-ruler and weighing-scale provided with clamping-jaws attached thereto, the clamping-jaws being of such form and arrangement that by manipulating them for the attachment of a letter or the like the weight of the parts of the ruler and scale will not be shifted with reference to the characters by which the weight is indicated, thereby maintaining a position of the parts for accurate weighing, no matter what the size of the article to be weighed may be.

With these objects in view the invention consists, essentially, of a combined ruler and scale comprising a main portion provided with the ordinary marks of subdivision of a ruler into inches and parts thereof, the main portion being provided at one end with a weight and at the other end with a clamping-jaw, the clamping-jaw being formed of parts so connected as to move in opposite directions, whereby the weight of the parts is maintained at the same distance from the center in the use of the device.

Further, the invention consists of a combined desk-ruler and scale comprising a main body provided with marks indicating the usual division of a ruler into inches and parts thereof and having at one end a weight and at the other end clamping-jaws, the jaws consisting of two plates provided on their inner faces with racks, and a pinion interposed between the racks whereby the plates are caused to slide in opposite directions and the weight of the parts maintained at the same distance from the center of the body during use.

Further, the invention consists of a combined desk-ruler and scale comprising a main body provided with the usual marks indicating inches and fractions thereof, having at one end a weight and at the other end clamping-jaws comprising plates of metal having their ends bent at right angles and provided with racks on their inner faces, and a pinion mounted on a shaft and engaging the racks and provided on its shaft with a spiral spring so connected with the pinion as to return the plates to their normal positions when released.

Further, the invention consists of a combined desk-ruler and scale comprising a main body provided at one end with a weight and at the other end with clamping-jaws made up of plates capable of sliding, the plates being so connected as to move in opposite directions, and one plate being provided with a spring-finger adapted to engage the end of the ruler and retain the jaws in an open position when desired.

The invention is illustrated in the accompanying drawings, in which—

Figure 2:
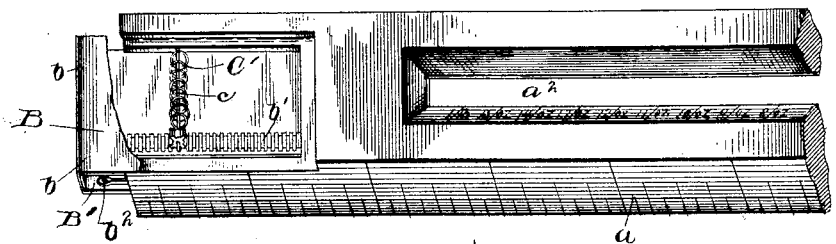
Figure 3:
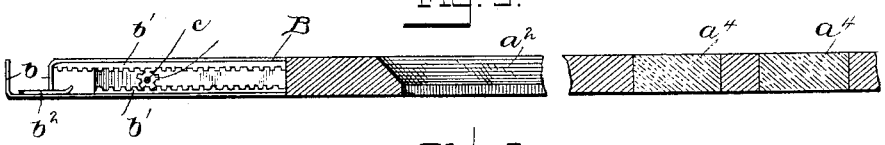

Figure 1 is a perspective view of a rule and scale constructed in accordance with my invention, the jaws being shown in an open position. Fig. 2 is a similar view, the upper jaw of the clamp being shown as broken away in order to show the position of the parts. Fig. 3 is a central longitudinal section of the ruler; and Fig. 4 is a perspective view of a modified form of clamping-jaws, the upper jaw being broken away.

In the drawings, A represents the main body of the ruler, which is provided with the usual beveled edge $a$, having thereon the marks indicating inches and divisions thereof. The center of the body is provided with a longitudinal slot $a^2$, having beveled edges, upon which are marks showing the weight of an article attached to one end of the ruler when a pencil or the like is arranged beneath one of the marks and the ruler balances.

Figure 4:
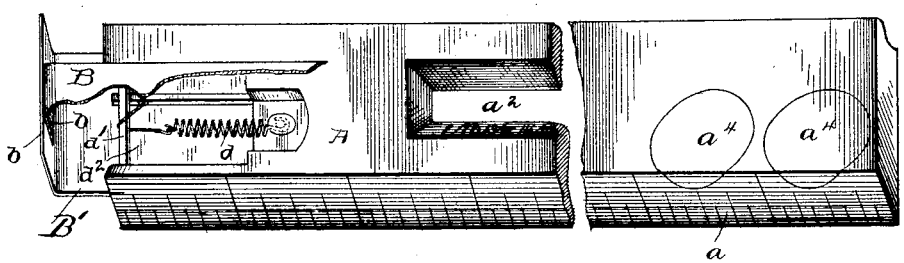

One end of the ruler is weighted in a suitable way, as by setting into the body, as shown in Figs. 3 and 4, portions $a^4$ of heavier material than the body of the article.

In order to attach an article to be weighed to the opposite end of the body A to that at which the weights are placed or attached, I provide clamping-jaws of suitable form, by which a letter or other small article may be held. The preferred form of these clamping-jaws is shown in Figs. 1 to 3 of the drawings. The jaws are made up of two plates B and B′, arranged, respectively, on the upper and lower faces of the main portion A of the ruler and scale, and each plate is provided with an end $b$, turned at right angles to the main portion of the plates, the ends of the respective plates being turned in opposite directions. Each plate is provided on its inner face with a rack $b'$, and arranged between the plates and meshing with the racks $b'$ $b'$ is a pinion C, mounted on a suitable shaft $c$, set into the body A, between the plates B and B′.

C′ represents a coil-spring arranged about the shaft $c$ of the pinion C and attached at one end to the pinion and at the other end to the body A. The plates B and B′ are so placed upon the body A as to be capable of sliding longitudinally thereon, and from the arrangement described it will be seen that when the lower plate B′ is moved outward to separate ends $b$ $b$ of the plates to receive a letter or the like the inner plate B will be moved inward. By this arrangement, the plates being of equal weight, the distribution of the weight of the article remains the same.

In order to hold the jaws apart when desired, I provide a spring-finger $b^2$, which is attached to the lower plate B′ and which is adapted to bear against the end of the main body A of the ruler when the plate B′ is drawn out. By depressing the spring-finger $b^2$ and moving it out of contact with the end of the body A the spring C′ will be free to return the parts to their normal closed position.

In the modified form of device shown in Fig. 4 of the drawings the jaws are each connected by a spring $d$ passing over a pin $d'$ extending across an opening $d^2$ in the end of the body A. The lower plate B′ is connected by a coil-spring, band of rubber, or the like with the main body, and the tendency of the spring or the like is to maintain the jaws in a closed position. The connection of the jaws by means of the spring insures their movement in opposite directions simultaneously, as in the preferred form already described.

In using the device the article, such as a letter or the like, is placed between the jaws and the body of the ruler is placed on a pencil, blade of a knife, or the like and moved in one direction or the other until it balances. The marks on the beveled edges of the longitudinal slot $a^3$ are so located that the one opposite the center of the pencil or the like on which the ruler is balanced will indicate the weight of the article held by the jaws.

Having thus described my invention, what I claim as new, and desire to secure by Letters Patent, is—

1. A combined ruler and scale comprising a main portion provided with marks indicating inches and divisions thereof, the main portion being provided at one end with a weight and at the other end with a clamping-jaw, the clamp being formed of parts so connected as to move in opposite directions when the jaw is opened and closed whereby the weight of the parts is at all times maintained at the same distance from the center, substantially as described.

2. A combined desk-ruler and scale comprising a main body provided with marks indicating inches and parts thereof, and having at one end a weight and at the other end clamping-jaws consisting of two plates provided on their inner faces with racks, and a pinion interposed between the racks, whereby the plates are caused to slide in opposite directions and the weight of the parts maintained at the same distance from the center of the body during use, substantially as described.

3. A combined desk-ruler and scale comprising a main body provided with marks indicating inches and fractions thereof, having at one end a weight and at the other clamping-jaws comprising plates of metal having their ends bent at right angles and provided with racks on their inner faces, and a pinion mounted on a shaft and engaging the racks to cause the plates to move equal distances in opposite directions simultaneously, the the shaft being provided with a spiral spring so connected with the pinion as to return the plates to their normal positions when released, substantially as described.

4. A combined desk-ruler and scale comprising a main body provided at one end with a weight and at the other end with clamping-jaws made up of plates capable of sliding, the plates being so connected as to move in opposite directions, and one plate being provided with a spring-finger adapted to engage the end of the ruler and retain the jaws in an open position, substantially as described.

In testimony whereof I affix my signature in presence of two witnesses.

MATTHEW F. CONNETT, Jr.

Witnesses:
J. C. ROLLINS,
E. E. CORD.